Dec. 25, 1962  R. C. BAUBLES  3,069,941
SCREW THREADING TOOL
Filed Jan. 6, 1960
3 Sheets-Sheet 1
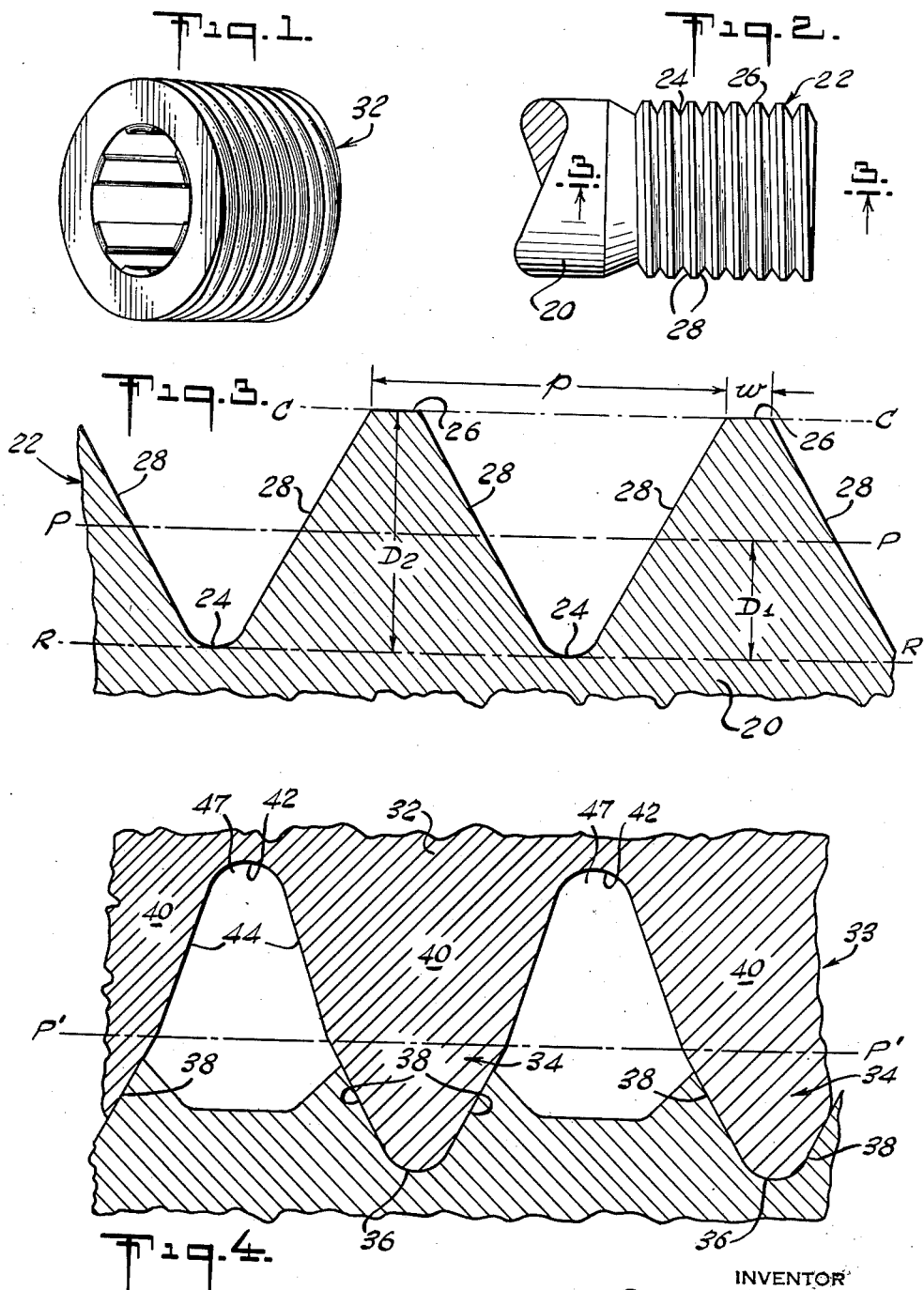
INVENTOR
RICHARD C. BAUBLES
BY
Richard A. Craig
ATTORNEY

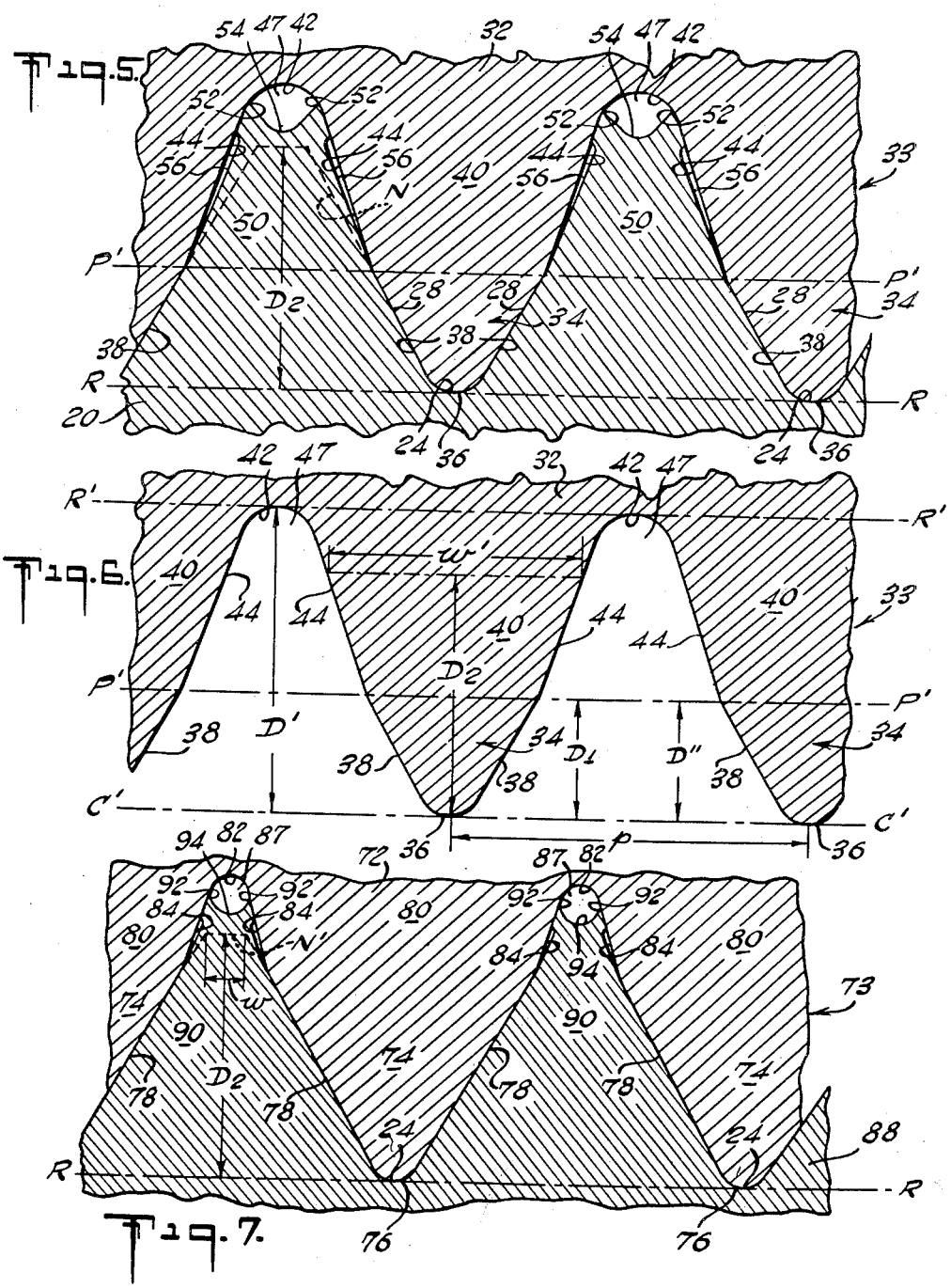

Dec. 25, 1962  R. C. BAUBLES  3,069,941
SCREW THREADING TOOL
Filed Jan. 6, 1960  3 Sheets-Sheet 3

INVENTOR
RICHARD C. BAUBLES
BY
Richard A. Craig
ATTORNEY

United States Patent Office 3,069,941
Patented Dec. 25, 1962

3,069,941
SCREW THREADING TOOL
Richard C. Baubles, West Orange, N.J., assignor to Elastic Stop Nut Corporation of America, Union, N.J., a corporation of New Jersey
Filed Jan. 6, 1960, Ser. No. 879
12 Claims. (Cl. 80—6)

This invention relates to screw threading tools, such as thread rolling tools or dies useful in performing an improved method of making an improved externally screw threaded article.

A thread rolling tool or die embodying the invention comprises a die face including ribbing of a predetermined pitch and having an outer portion having a crest defining a crest line or cylinder tangential to the crest and outer flanks extending from the crest at a first thread angle and defining a pitch line or cylinder located a first distance from the crest line. The ribbing also has an inner portion including a root defining a root line or cylinder tangential to the root and located a second distance from the crest line greater than the standard height of the external thread to be rolled. The inner portion also has inner flanks joining the outer flanks at a third distance from the crest line less than the standard height referred to and extending from the outer flanks toward the root at a second thread angle less than the first thread angle and joining the root.

It has been discovered that an externally screw threaded article having greatly improved properties with respect to the best prior art articles, particularly as to fatigue life, can be produced by the aid of dies embodying the invention.

It is known that rolled threads are superior to cut threads as to fatigue life.

It is also known that fatigue failure is prone to start in any body at regions of tension stress concentration. It is also known that, in the case of an external screw thread, fatigue failure always begins at the thread root. These facts indicate that a substantial improvement in the fatigue life of an external screw thread should result if the screw threaded article possesses a high residual compression stress lengthwise of the article at the thread root. The present invention enables that result to be achieved.

Important objects of the invention are therefore to provide an improved thread rolling tool or die which can be used in producing externally screw threaded articles having vastly improved properties, particularly fatigue life, with respect to the best heretofore known articles having rolled external screw threads.

The above and other objects and advantages will appear from the following description of examples of the invention and the accompanying drawings in which:

FIG. 1 is a perspective view of a cylindrical thread rolling die embodying the invention;

FIG. 2 is a fragmentary elevational view of an externally screw threaded fastening device in the manufacture of which a die (or set of dies) embodying the invention was used;

FIG. 3 is an enlarged fragmentary view taken on line 3—3 of FIG. 2;

FIG. 4 is a fragmentary sectional view through the axis of a work piece showing in axial section the die of FIG. 1, the parts being shown shortly after the start of a thread rolling operation;

FIG. 5 is a view similar to FIG. 4 but showing the parts at the end of the thread rolling operation;

FIG. 6 is a view similar to FIGS. 4 and 5 but showing the die by itself;

Figure 8:
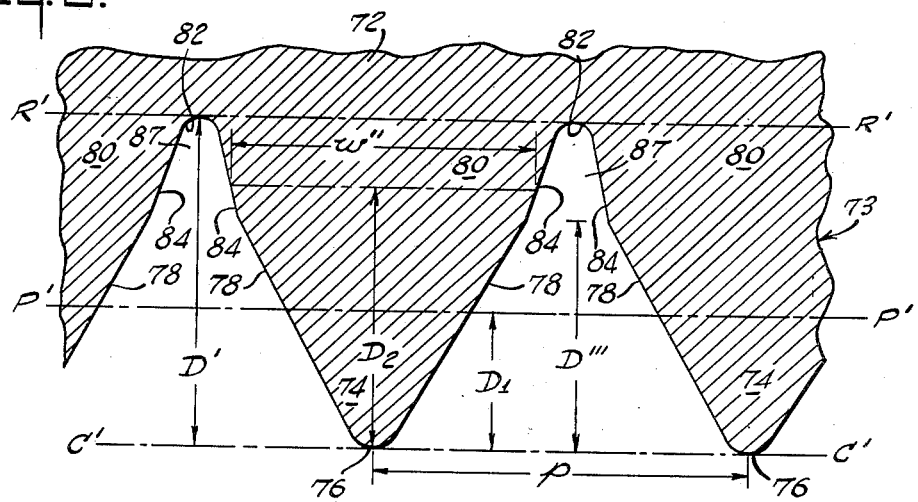
Figure 9:
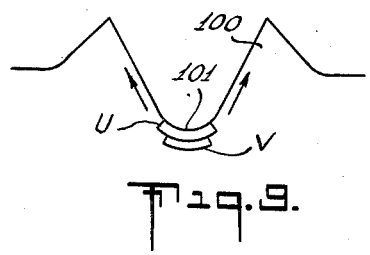
Figure 10:
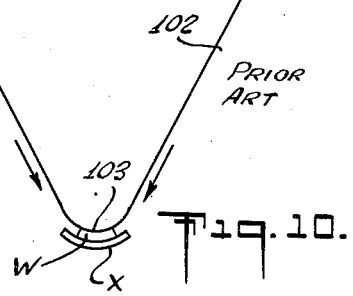
Figure 11:
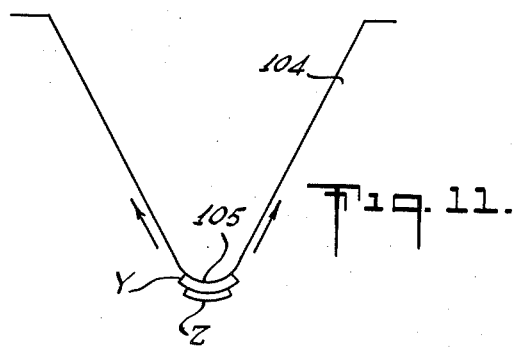

FIGS. 7 and 8 are views similar, respectively, to FIGS. 5 and 6 but showing a modified die embodying the invention; and FIGS. 9, 10 and 11 are diagrammatic views illustrating why the fatigue improvement made possible by the invention is thought to occur.

FIG. 1 shows in perspective a cylindrical thread rolling die 32 embodying the invention. FIGS. 2 and 3 show a metal externally screw threaded article 20 defining an axis and having thereon an external screw thread 22 which includes a root 24, a crest 26 and flanks 28 joining root 24 and crest 26. Thread 22 was formed on body 20 by a thread rolling operation, followed by a secondary operation which will be described. As shown, the diameter of the unthreaded portion of the body 20 is substantially equal to the crest diameter of thread 22, but the initial diameter of that portion of the surface of body 20 on which thread 22 was formed was intermediate the root and crest diameters of thread 22 and more precisely was slightly greater than the maximum pitch diameter of thread 22.

Root 24 of thread 22 defines a root cylinder indicated in FIG. 3 at R—R and crest 26 defines a crest cylinder indicated in FIG. 3 at C—C.

Thread 22 is a typical thread of Unified thread form of a predetermined pitch $p$. Flanks 28 extend outwardly from root 24 at a thread angle of 60° and define a pitch cylinder indicated in FIG. 3 at P—P. Cylinder P—P is coaxial with and located a dedendum distance $D_1$ from root cylinder R—R. Crest cylinder C—C is coaxial with root cylinder R—R and spaced therefrom a distance $D_2$ which is the height of the external thread. The maximum value of $D_2$ is the sum of dedendum distance $D_1$ and 0.32476 times pitch $p$. Thread 22 has a standard width of flat ($w$) at crest 26 equal to 0.125 times pitch $p$. These dimensions are standard for Unified external threads. Furthermore, for Unified threads, dedendum distance $D_1$ is 0.28867 times pitch $p$.

Each of FIGS. 4, 5 and 6 shows die 32 in fragmentary axial section. Die 32 comprises a die face including ribbing indicated generally at 33. Ribbing 33 is of predetermined pitch $p$ (FIG. 6) and has an outer portion 34 having a crest 36 defining a crest line or cylinder indicated in FIG. 6 at C'—C'. Crest line C'—C' is tangential to crest 36. Outer portion 34 also has outer flanks 38 extending from crest 36 at a first thread angle of 60° and defining a pitch line or cylinder indicated in FIG. 6 at P'—P'. Pitch line P'—P' is located the thread dedendum distance $D_1$ (FIG. 6) from crest line C'—C'.

Ribbing 33 also includes an inner portion 40 including a root 42 defining a root line or cylinder indicated in FIG. 6 at R'—R'. Root line R'—R' is tangential to root 42 and is located a distance D' (FIG. 6) from crest line C'—C'. D', which is the height of rib 33, is greater than the standard height $D_2$ of the external thread to be rolled, i.e. greater than the sum of $D_1$ and 0.32476 times pitch $p$. Inner portion 40 also has inner flanks 44 joining outer flanks 38 at a distance D'' (FIG. 6) from crest line C'—C' less than the sum referred to. Inner flanks 44 extend from outer flanks 38 toward root 42 at a second thread angle of less than 60° and join root 42. Ribbing 33 has a width $w'$ (FIG. 6) which is less than 0.875 times pitch $p$ at the distance $D_2$ from crest line C'—C'.

Specifically, in die 32 distance D'' is less than the standard thread height $D_2$ and is equal or substantially equal to dedendum distance $D_1$.

Root 42 and flanks 44 provide die 32 with a relief cavity 47.

The manner of forming thread 22 with the aid of die 32 will now be described, with particular reference to FIGS. 4 and 5. FIG. 4 shows die 32 engaging body 20 shortly after a thread rolling operation has begun and FIG. 5 shows die 32 engaging body 20 at the end of the thread rolling operation.

During the rolling operation, ribbing 33 of a set of dies 32 progressively penetrates body 20. Die crest 36 of each die is the first part to engage body 20, followed immediately by outer flanks 38, these parts of each die 32 together applying external coining force to a part only of the surface of body 20, until, shortly after the rolling operation has begun, the parts are as shown in FIG. 4. The rolling operation continues until at the end thereof the parts are as shown in FIG. 5. During the rolling operation each die 32 has applied external coining force to a part only of the surface of body 20 to form thereon an inner portion of a thread 50, this inner portion being the same as a part of thread 22, having root 24 defining root cylinder R—R tangential to root 24 and inner flanks 28 extending outwardly from root 24 at a first thread angle of 60° and defining pitch cylinder P—P (FIG. 3) coaxial with and located dedendum distance $D_1$ from root cylinder R—R.

During the coining step just described material of body 20 is extruded outwardly, into relief cavity 47, to form an outer portion of thread 50, this outer portion including a crest having a pair of peaks 52 and a valley 54 therebetween. Each peak 52 is located a distance from root cylinder R—R greater than $D_2$. It should be remembered that $D_2$ equals the sum of $D_1$ and 0.32476 times pitch $p$. The outer portion of thread 50 also has outer flanks 56 extending inwardly from peaks 52 at a second thread angle of less than 60° and joining inner flanks 28 at the outer extremities thereof.

The method described takes place wholly without application of external force to the crest of thread 50 between peaks 52.

At the conclusion of the thread rolling operation the diameter of root cylinder R—R is equal to the desired final root diameter of the thread, and the width of thread 50 is greater than 0.125 times pitch $p$ at a distance from root cylinder R—R equal to the standard height of thread $D_2$.

It is to be noted that during the thread rolling operation described, material of body 20 is substantially freely outwardly extruded into relief cavity 47, i.e. no substantial work shaping of forming pressures are applied by die flanks 44 to body 20.

Thread 50 can be, if desired, converted to thread 22 by removing, as by grinding or other machining operation, that part of thread 50 which is outside line (FIG. 5). Thus in thread 22 crest 26 is machined as are those parts of flanks 28 further from root cylinder R—R than pitch cylinder P—P.

The initial diameter of that part of body 20 on which thread 50 was rolled was slightly greater than the pitch diameter of threads 50 and 22 in order to provide the material which at the end of the rolling operation lies outside line N.

The second thread angle of die 32 is preferably about 29° and the second thread angle of thread 50 is also about 29°.

The thread angle of the inner die flanks could, insofar as the fatigue life of resultant articles is concerned, be less than 29° and could be as little as 0°. However, for maximum die life the relief cavity of the die should be as small as possible. The smaller the relief cavity, the stronger the die and the longer its life will be.

Comparative fatigue tests, involving the use of axial stress applied by a constant load fatigue testing machine of the type utilizing inertia forces, of high quality prior art bolts and bolts provided with external thread 22 of FIG. 3 and made with the aid of dies as detailed in FIGS. 4, 5 and 6 in accordance with the method herein disclosed show a remarkable improvement in fatigue characteristics in favor of thread 22. Such comparative fatigue tests showed, for example, that the average cycles to failure of a ⅜-24 thread of a 180,000 p.s.i. bolt tested at a stress level of 120,000 p.s.i. had been increased, on the average, over 3 times, and when tested at a stress level of 83,000 p.s.i., had been increased, on the average, over 20 times and that the average cycles to failure of a 220,000 p.s.i. bolt was increased on the average from thirty to two hundred times for a wide range of stress levels.

While in the use of die 32 as set forth hereinbefore, the entire extruded portion of the thread is formed without external application thereto of any substantial work shaping or coining pressures, applicant has found that surprising improvements in fatigue life may be obtained and the required machining of the flank surfaces minimized, by the use of dies having smaller relief cavities.

Accordingly, FIGS. 7 and 8, which, as stated, are respectively similar to FIGS. 5 and 6, show a second form of die 72 embodying the invention.

In the following description it will be assumed without limitation that die 72 is of the same thread form and size as die 32. Except for those dimensions of die 72 which differ from die 32 the same reference letters are applied.

Die 72 comprises a die face including ribbing indicated generally at 73. Ribbing 73 is a pitch $p$ (FIG. 8) and has an outer portion 74 having a crest 76 defining a crest line or cylinder indicated in FIG. 8 at C'—C'. Crest line C'—C' is tangential to crest 76. Outer portion 74 also has outer flanks 78 extending from crest 76 at a first thread angle of 60° and defining a pitch line or cylinder indicated in FIG. 8 at P'—P'. Pitch line P'—P' is located dedendum distance $D_1$ (FIG. 8) from crest line C'—C'.

Ribbing 73 also includes an inner portion 80 including a root 82 defining a root line or cylinder indicated in FIG. 8 at R'—R'. Root line R'—R' is tangential to root 82 and is located a distance D' (FIG. 8) from crest line C'—C'. D', which is the height of ribbing 73, is greater than the standard height $D_2$ of the external thread to be rolled, i.e., greater than the sum of $D_1$ and 0.32476 times pitch $p$. Inner portion 80 also has inner flanks 84 joining outer flanks 78 at a distance D''' (FIG. 8) from crest line C'—C' less than the sum referred to. Inner flanks 84 extend from outer flanks 78 toward root 82 at a second thread angle of less than 60° and join root 82. Ribbing 73 has a width $w''$ (FIG. 8) which is less than 0.875 times pitch $p$ at the distance $D_2$ from crest line C'—C'.

Specifically, in die 72 distance D''' is only slightly less than the standard thread height $D_2$ and is considerably more than dedendum distance $D_1$.

Root 82 and flanks 84 provide die 72 with a relief cavity 87 which is smaller than relief cavity 47.

Die 72 may be used in a manner similar to that described hereinbefore for die 32 to produce externally screw threaded articles of greatly improved fatigue characteristics. FIG. 7 shows die 72 engaging a metal work piece 88 at the end of a thread rolling operation in which a thread 90 was rolled on work piece 88 and during which the inner portion of thread 90 was coined (i.e. that portion of thread 90 closer to root cylinder R—R than distance D''') and the outer portion of thread 90 was substantially freely outwardly extruded into relief cavity 87. The width of the inner portion of thread 90 at the outer extremity of such inner portion is greater than $w$, which as stated is equal to 0.125 times pitch $p$.

Like thread 50, thread 90 has at its crest a pair of peaks 92 and a valley 94 therebetween. Each peak 92 is located a distance from root cylinder R—R greater than $D_2$.

In the use of die 72 no external force is applied to the crest of thread 90 between peaks 92.

At the conclusion of the thread rolling operation with die 72 the diameter of root cylinder R—R is equal to the desired final root diameter of the thread, and the width of thread 90 is greater than 0.125 times pitch $p$ at a distance from root cylinder H—R equal to the standard height of thread $D_2$.

Thread 90 can be, if desired, converted to the shape of thread 22 by removing, as by grinding or other machining operation, that part of thread 90 which is outside line N' (FIG. 7).

The second thread angle of die 72 is preferably about 29° and the second thread angle of thread 90 is also about 29°.

Applicant has found that, with either dies 32 or die 72, if the second thread angle is reduced to be less than 29° the second thread angle of the resultant article is still about 29°. This indicates that in the use of die 32 and die 72 little or no forming pressure is exerted on the work piece by the inner die flanks 44 and 84.

It has also been found that to obtain maximum fatigue improvement the width of every part of thread 50 and thread 90 (including peaks 52 and 92) should be greater than $w$ (0.125 times pitch $p$). To this end the width of ribbing 33 and 73 is less than 0.875 times pitch $p$ at all locations thereof less than some distance from die crest line C'—C' greater than $D_2$. Root 42 of die 32 is curved and tangential to and joins inner flanks 44 at a distance greater than $D_2$ from crest line C'—C' of die 32, and root 82 of die 72 is curved and tangential to and joins inner flanks 84 at a distance greater than $D_2$ from crest line C'—C' of die 72.

Remaining for explanation is the theory as to why threads producing by a die (or set of dies) embodying the invention have at least a much greater residual compression stress at the critical root area than the best prior art rolled threads produced by prior art practices. For this explanation reference is made to FIGS. 9, 10 and 11.

In FIG. 9 there is shown part of an article having a partially formed external rolled thread 100 having a root 101, thread 100 being formed on a metal body by either a prior art die or a die embodying the invention, the die having exerted no back pressure along the flanks of thread 100. The action of the die has lengthened the fibers at the surface of the body at root 101 as indicated by the arrows in FIG. 9 and has lengthened the fibers just inside the surface of the body at root 101, by a lesser amount, and so on toward the axis of the body. Consider a mass U of material at the surface of the body at root 101 and a mass V inside the body and immediately adjacent mass U, and assume that masses U and V were of the same length prior to any deformation of the body. As stated, the action of the die has tended to cause a greater permanent lengthening of mass U than mass V, and if masses U and V were free, such lengthenings would occur independently of each other. However, masses U and V can not slide freely with respect to each other, so mass U exerts force tending to lengthen mass V, and conversely mass V exerts force tending to shorten mass U. This last mentioned force tends to build into mass U a residual compression stress.

In FIG. 10 there is shown part of a prior art article having a finished external rolled thread 102 having a root 103, thread 102 being formed on a metal body by a prior art die the root of which exerted a back pressure on the thread crest and down the flanks of thread 102 at the end of the rolling operation, as indicated by the arrows in FIG. 10, this back pressure tending to shorten the fibers at the surface of the body at root 103 and, by a lesser amount, the fibers of the body just inside the surface of the body, and so on toward the axis of the body. Consider a mass W of material at the surface of the body at root 103 of thread 102 and a mass X inside the body and immediately adjacent mass W, and assume that masses W and X were of the same length prior to any deformation of the body. Until the back pressure was applied, starting near the end of the rolling operation, the action was as explained above in connection with FIG. 9. The back pressure tends to shorten each of masses W and X, but the tendency is for mass W to be shortened more than mass X. However, masses W and X can not slide freely with respect to each other, so mass W exerts force tending to shorten mass X, and conversely mass X exerts force tending to lengthen mass W, and it is this last mentioned force which tends to nullify the residual compression stress in mass W or which may even result in a residual tension stress in mass W.

In FIG. 11 there is shown part of an article having a finished thread 104 having a root 105 and having been formed by the method herein disclosed with the aid of a set of dies embodying the invention and which exerted no pressure on the thread crest and substantially no back pressure down the thread flanks. The condition shown in FIG. 11 is similar to that of FIG. 9. The arrows in FIG. 11 indicate that the dies did not tend to shorten the fibers at and just inside root 105, this condition being further indicated by masses Y and Z which are similar, respectively, to masses U and V of FIG. 9. Thus for the same reasons given above in connection with FIG. 9, a high residual compression stress is built into mass Y.

Residual compression stress in any element tends to relieve itself by lengthening the element in the direction of the stress. It would therefore be assumed that in the case of a threaded body in which the root of the thread is in residual compression lengthwise of the body, material could be removed from the thread to allow the compression stress to relieve itself at least partially and in so doing to cause a measurable dimensional change.

An elongation test involved two solid specimens of a nominal hardness of 38 on the Rockwell C scale and having ½-20 external rolled threads having a thread angle of 60 degrees. The thread of the first specimen embodied the prior art, whereas the thread of the second specimen was produced by a set of dies as detailed in FIGS. 4, 5 and 6 in accordance with the method herein disclosed for those views.

The pitch diameter of the thread of the first specimen of the elongation test was measured by the standard three-wire method using 0.02887 inch diameter wires, which are of the so-called "best size" for threads of the size and angle involved. This involved three test locations, the first on one side of the specimen and the other two on the other side of the specimen.

Material was then carefully removed from the exterior of the first specimen to expose first, second, third and fourth plane surfaces. The first and second surfaces were parallel and identical and faced away from each other and were parallel to the axis (hereinafter called the "test wire axis") defined by the test wire at the first test location while the pitch diameter was being measured as aforesaid, and the first and second surfaces were on opposite sides of the test wire axis and were separated by a distance slightly less than the pitch of the thread and were equidistant from the test wire axis. The third and fourth surfaces were in a common plane which was: perpendicular to the first and second surfaces; parallel to the test wire axis, and to the third axis; and tangential to the thread root on the same side of the specimen as the first test location. The third surface intersected and provided the inner limit of the first surface and was entirely on the same side of the first test location as the first surface, and the fourth surface intersected and provided the inner limit of the second surface and was entirely on the same side of the first test location as the second surface.

Thus the thread root at the first test location of the first specimen of the elongation test remained securely anchored in its original position, but the parts of the thread between the exposed surfaces were freed. Under these circumstances it would be expected that residual stress originally present at the thread root at the first test location would be at least partially relieved to change the thread angle, and an original compression stress would be expected to result in a spreading of the thread flanks and a decrease in the indicated pitch diameter at the first test location.

Following the removal of material from the first specimen of the elongation test the pitch diameter was again measured using the same test locations and the same wires.

The identical procedure outlined above was followed in the case of the second specimen of the elongation test. The distance between the first and second surfaces of the second specimen was the same as that of the first specimen.

It was found that the indicated pitch diameter of each of the first and second specimens of the elongation test decreased, the decrease in the case of the first specimen being 0.0002 inch and the decrease in the case of the second specimen being 0.0004 inch. These results: (a) indicate that each of the first and second specimens of the elongation test originally had a residual compression longitudinal stress at the root at the first test location and elsewhere; (b) confirm that the present invention has enabled a notable increase in this stress; and (c) give further explanation for the great fatigue life improvement made possible by the present invention.

While the herein-disclosed examples of the invention are cylindrical in form the invention applies equally to other types of tools such as flat dies.

This is a continuation-in-part of each of copending applications Serial No. 644,548 filed March 7, 1957, now abandoned, and Serial No. 740,656 filed June 9, 1958.

The details of the illustrated and described examples of the invention are not to be taken as limitations on the invention except as such details may be present in the appended claims, since many changes can be made without departing from the broad inventive concepts.

What is claimed is:

1. A thread rolling tool comprising a die face including ribbing of a predetermined pitch and having an outer work shaping portion having a crest defining a crest line tangential to said crest and outer flanks extending from said crest at a first thread angle of 60° and defining a pitch line located a first distance from said crest line equal to the dedendum distance of the thread to be rolled by the tool, said ribbing also having an inner portion including a root defining a root line tangential to said root and located a second distance from said crest line greater than the sum of said first distance and 0.32476 times said pitch, said inner portion also having inner flanks joining said outer flanks at a third distance from said crest line less than said sum and extending from said outer flanks toward said root at a second thread angle of less than 60° and joining said root, the width of said ribbing being less than 0.875 times said pitch at a fourth distance equal to said sum from said crest line.

2. The invention set forth in claim 1 wherein the width of said ribbing is less than 0.875 times said pitch at all locations thereof less than a fifth distance from said crest line, said fifth distance greater than said sum.

3. The invention set forth in claim 2 wherein said root is curved and tangential to and joins said inner flanks at said fifth distance from said crest line.

4. The invention set forth in claim 1 wherein said second thread angle is in the range having a lower limit of 0° and an upper limit of about 29°.

5. The invention set forth in claim 1 wherein said third distance is greater than said first distance.

6. The invention set forth in claim 1 wherein said third distance is substantially equal to said first distance.

7. A thread rolling die comprising ribbing generated about a predetermined pitch line and of a predetermined pitch, the cavities between the ribbing being of a predetermined total depth, the ribbing including outer work shaping portions terminating in work shaping crest surfaces spaced outwardly from the pitch line the standard thread dedendum distance of an external thread and having opposed work shaping flank surfaces at a first predetermined thread angle, said opposed flank surfaces extending inwardly from the crest surfaces for a second predetermined distance less than the standard height of the external thread, said ribbing also having inner portions with opposed flank surfaces at an included thread angle substantially less than the first predetermined thread angle, said opposed flank surfaces of the inner portions merging at their outer ends with the opposed flank surfaces of the outer portions of the ribbing, and the predetermined total depths of the cavities between the ribbing being substantially greater than the standard height of the external thread.

8. A screw threading tool comprising a die face having ribbing of a predetermined thread pitch, the outer portions of the ribbing defining work shaping crest surfaces and work shaping outer flanks extending inwardly from said crest surfaces at a standard thread angle and defining a pitch line located a standard external thread dedendum distance from a crest line substantially tangential to said crest surfaces, said ribbing also having inner portions including root surfaces defining a root line tangential to said root surfaces, said root line being located a distance from said crest line greater than the standard external thread height, said inner portions of the ribbing also having inner flanks joining said outer flanks at a distance from said crest line which is less than said standard thread height and extending from said outer flanks toward said roots at a thread angle substantially less than said standard thread angle and joining said root surfaces, the width of the ribbing being less than 0.875 times said pitch at a distance from said crest line equal to the standard thread height.

9. A thread forming die having ribbing with work shaping crest portions conformed in external shapes and dimensions to the root portions of the desired standard external V-form thread, said ribbing providing thread forming cavities each defined by adjacent wall surfaces of the ribbing, said wall surfaces outwardly of the thread pitch line of the die cavities being work shaping and conforming in shapes and dimensions to the adjacent flank portions of said standard thread inwardly of the pitch cylinder of such thread, said wall surfaces inwardly of the thread pitch line of the die being inclined to said pitch line at a substantially greater angle than the flank angle of said standard thread to form inwardly of the thread pitch line of the die an extrusion cavity of greater volume than the volume of material displaced by the coining action of the wall surfaces of the die outwardly of the thread pitch line of the die and said cavity being of greater than standard external thread width along every line parallel to said pitch line and inwardly of said pitch line.

10. A screw threading tool comprising a die body having thread forming ribbing projecting therefrom and cavities between the ribbing formed by pairs of adjacent outer work shaping surfaces of standard thread angle extending inwardly for a distance measured normal to the thread pitch line of the ribbing which is not less than the standard dedendum distance of the external thread to be formed and less than the standard height of said external thread and pairs of adjacent inner flank surfaces of an included angle less than one-half said standard thread angle and extending inwardly from a corresponding pair of adjacent outer flank surfaces to the body from which the ribbing projects, the depth of the ribbing normal to said pitch line being substantially greater than the standard height of said external thread.

11. A screw threading tool comprising a die body having thread forming ribbing projecting therefrom and cavities between the ribbing formed by pairs of adjacent outer work shaping surfaces of standard thread angle extending inwardly for a distance measured normal to the thread pitch line of the ribbing which is not less than the standard dedendum distance of the external thread to be formed and less than the standard height of said external thread and pairs of adjacent inner flank surfaces of an included angle substantially less than said standard thread angle and extending inwardly from a corresponding pair of adjacent outer flank surfaces to the body from which the ribbing projects, the depth of the ribbing normal to said pitch line being substantially greater than the standard height of said external thread.

12. A thread rolling tool comprising a die face including ribbing of a predetermined pitch and having an outer work shaping portion having a crest defining a crest line tangential to said crest and outer flanks extending from said crest at a first thread angle of 60° and defining a pitch line located a first distance from said crest line, said first distance approximately equal to 0.28867 times said pitch, said ribbing also having an inner portion including a root defining a root line tangential to said root and located a second distance from said crest line greater than the sum of said first distance and 0.32476 times said pitch, said inner portion also having inner flanks joining said outer flanks at a third distance from said crest line less than said sum and extending from said outer flanks toward said root at a second thread angle of less than 60° and joining said root, the width of said ribbing being less than 0.875 times said pitch at a fourth distance equal to said sum from said crest line.

References Cited in the file of this patent

UNITED STATES PATENTS

| | | |
|---|---|---|
| 594,339 | Ames | Nov. 23, 1897 |
| 1,865,575 | Locke | July 5, 1932 |
| 2,335,590 | Gersman | Nov. 30, 1945 |
| 2,656,740 | Bedker | Oct. 27, 1953 |
| 2,750,034 | Gersman | June 12, 1956 |

FOREIGN PATENTS

| | | |
|---|---|---|
| 564,269 | Great Britain | Sept. 20, 1944 |
| 751,103 | Germany | Sept. 22, 1952 |

OTHER REFERENCES

An Investigation of the Laws of Plastic Flow, Scientific Paper No. 278, by Eugene C. Bingham, Bureau of Standards Bulletin, volume 13, 1917. (QC 1 U 5 Scientific Library.)

The Extrusion of Metals, Pearson, chapter 5, pages 98–113, published by John Wiley and Sons Inc., 1953.

Design of Machine Elements, second edition (Spotts), Prentice-Hall Inc., 1953. (Table 5–1, page 165 relied upon.)

UNITED STATES PATENT OFFICE

CERTIFICATE OF CORRECTION

Patent No. 3,069,941                      December 25, 1962

Richard C. Baubles

It is hereby certified that error appears in the above numbered patent requiring correction and that the said Letters Patent should read as corrected below.

Column 3, line 42, for "of" read -- or --; line 46, after "line" insert -- N --; column 4, line 21, for "a" read -- of --; line 71, for "H-R" read -- R-R --; column 5, line 25, for "producing" read -- produced --;

Signed and sealed this 11th day of June 1963.

(SEAL)
Attest:

ERNEST W. SWIDER
Attesting Officer

DAVID L. LADD
Commissioner of Patents